United States Patent
Nemoto

[15] 3,685,111
[45] Aug. 22, 1972

[54] MULTI-SPINDLE AUTOMATIC BAR MACHINE

[72] Inventor: Kenji Nemoto, Tokyo, Japan
[73] Assignee: Seiko Seiki Kabushiki Kaisha
[22] Filed: Dec. 8, 1969
[21] Appl. No.: 883,047

[30] Foreign Application Priority Data
Dec. 18, 1968    Japan ..................... 43/92540

[52] U.S. Cl. ............................ 29/27, 29/37 A, 82/3
[51] Int. Cl. ........................................... B23b 11/00
[58] Field of Search ................. 82/3; 29/27, 37 A

[56] References Cited

UNITED STATES PATENTS

| | | | |
|---|---|---|---|
| 1,947,799 | 2/1934 | Rupple | 82/3 |
| 1,955,220 | 4/1934 | Biewend et al. | 82/3 |

FOREIGN PATENTS OR APPLICATIONS 640,278    5/1962    Italy ................................. 82/3

*Primary Examiner*—Leonidas Vlachos
*Attorney*—Blum, Moscovitz, Friedman & Kaplan

[57] ABSTRACT

A multiple-spindle bar machine has a rotatable and indexable drum with tool carriers and drives at each position. The bar machine is particularly suitable for the high precision production of long parts of small diameter in that it is fitted with a moving support which fits around the workpiece and is maintained at a constant distance from the corresponding bit thereby minimizing deflection of the workpiece, and because it is also fitted with locating pins and stops in both radial and circumferential directions. The bar machine also provides for cutting of gears with high precision.

3 Claims, 16 Drawing Figures

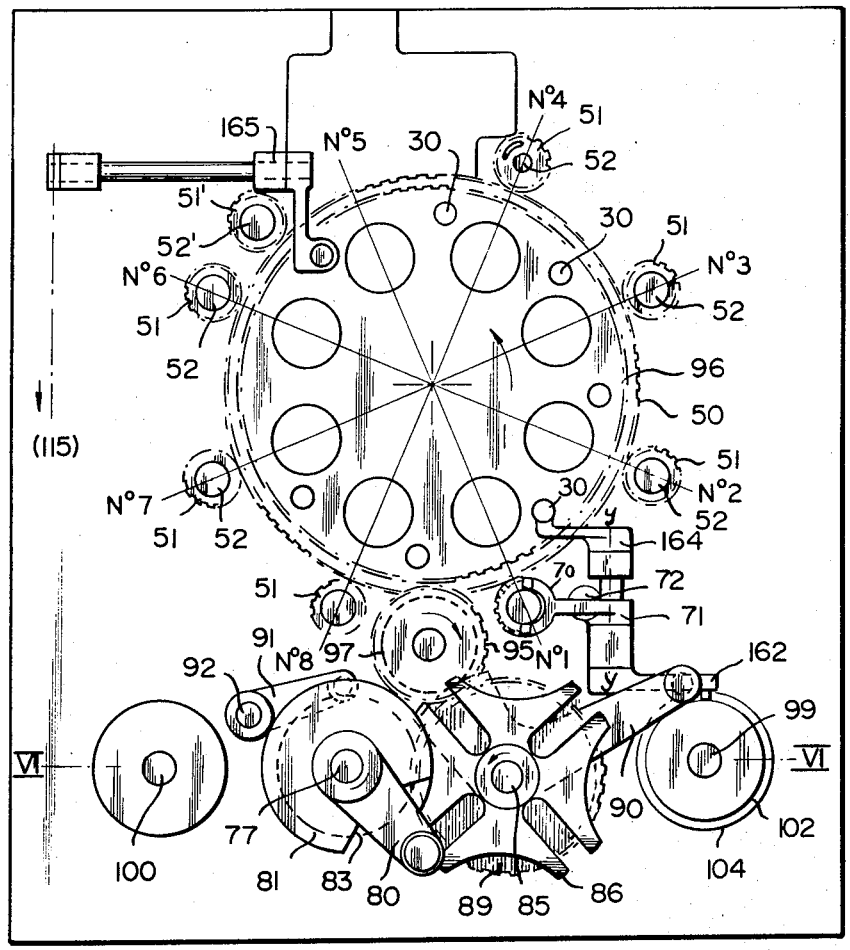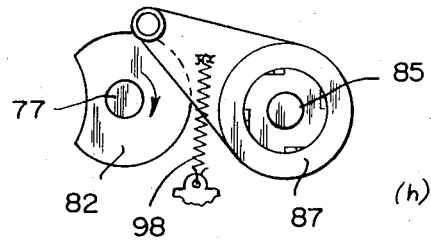
FIG. 5

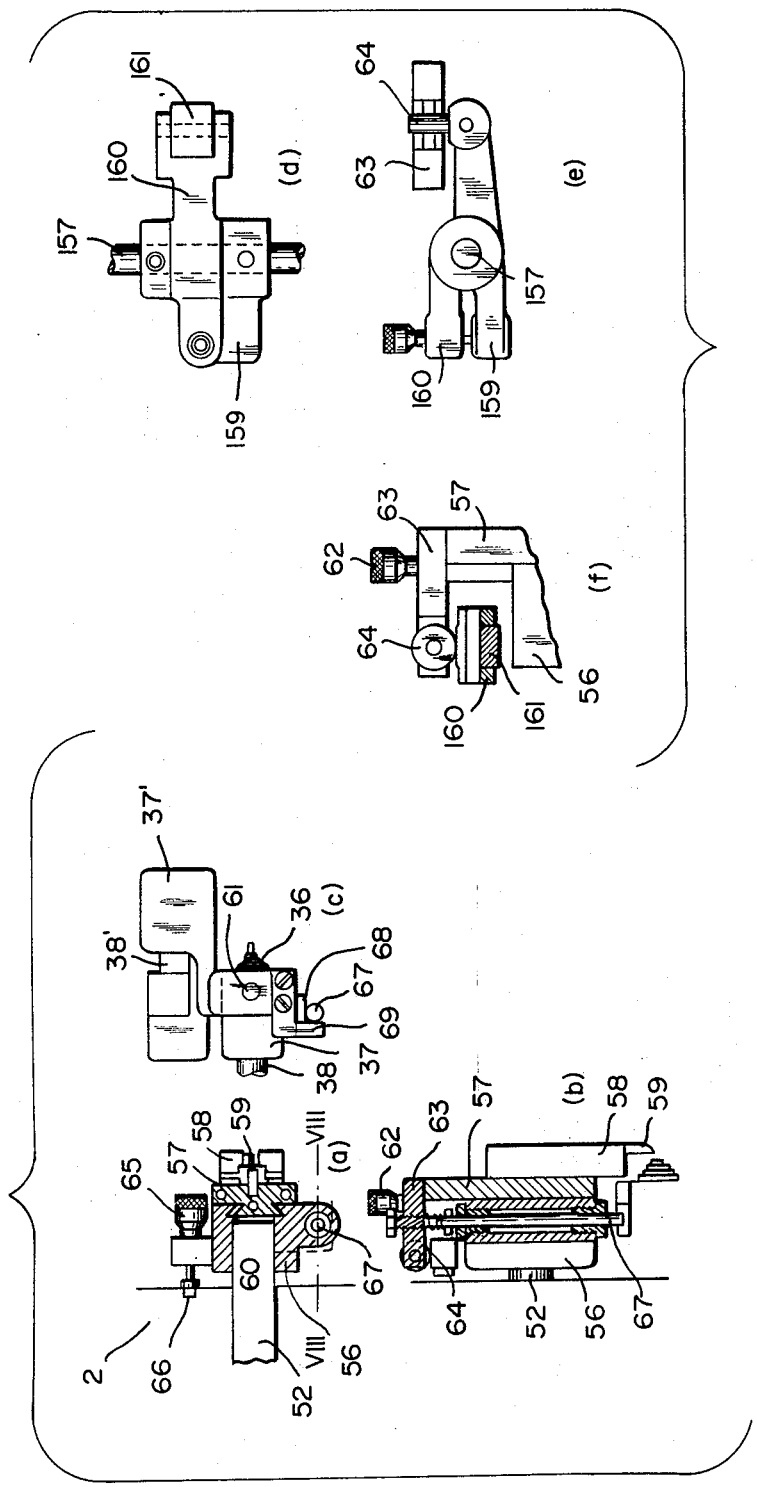

MULTI-SPINDLE AUTOMATIC BAR MACHINE

This invention relates to a multi-spindle automatic bar machine, particularly to a multi-spindle working machine that works fine and long parts of high precision with high efficiency. The multi-spindle automatic machine mentioned here means such a machine in which a number of work spindles, for instance 6 to 8 in number, are mounted on a spindle drum, said drum being made to rotate at an appropriate time to feed said work spindles successively to each working position, and the tools set at each working position are arranged so as to work on each worked material carried by each work spindle simultaneously, and when the tools set at their working positions are turning tools, we have a multi-spindle lathe, while when hobcutting attachments are set as parts of the turning tools, we have a multi-spindle pinion-making machine, thus by providing various different accessories, we are able to attain a machine of wide use.

Heretofore, in a multi-spindle automatic bar machine many work spindles are supported on its drum to bring about very complicated construction, and there has been none that provides a mechanism of making a longitudinally sliding movement of spindle head as in a single-spindle automatic machine. Therefore, a mechanism for keeping constant the relative distance between a guide bushing and a tool and thereby to control the deflection of the workpiece in a radial direction and enhance the accuracy of a multi-spindle machine has been lacking. In other words, the distance between the position of a chuck at the end of the work spindle that grips the worked material and the position of a tool that causes the cutting resistance varies in a wide range, and as the position of the tool becomes further from the position of the chuck, as well as the diameter of the worked material becomes smaller, the amount of displacement of the worked material caused by the cutting resistance is increased, resulting in a decrease of the working accuracy. In such a machine as the number of its work spindles is increased, the construction becomes more complicated, and the cumulative errors in locating the drum that rotates and grips the work spindles become great, thereby causing further decrease of the working accuracy. Especially a too-small diameter of the worked material makes the errors affect the accuracy to a great degree.

As a result, despite the very high efficiency of the conventional multi-spindle automatic bar machine, and despite its capability of simultaneous working of worked material carried by each work spindle at its working position, the machine frequently cannot be applied, particularly to slender and long parts that require high precision.

It is an object of this invention to offer a multiple-spindle automatic bar machine of high accuracy and high efficiency by removing the first cause of the defects mentioned above, in which a guide bushing movable slidably in the longitudinal direction of each spindle axis is provided on the front of the spindle and tool carriers movable slidably in the radial and longitudinal directions of the drum axis are provided at each working position, a construction is brought about to regulate the longitudinal movement of the point of cutting tool and the end face of the guide bushing by a cam to maintain the relative position between them, whereby high accuracy similar to the case of a single-spindle automatic machine together with the high efficiency of a multiple-spindle automatic machine can be achieved.

A second object of this invention is to offer a multiple-spindle bar machine in which in order to remove the second cause of the lowering of accuracy mentioned before, location stops are provided securely in the guide bushing carriers set at the front of each work spindle in the circumferential and radial directions of the drum rotation, said location stops being made to engage with location pins mounted on the tool carrier at each working position corresponding to each location stop, the relative position between the point of cutting tool and the worked material being controlled at the nearest place to the working position, whereby a construction which nullifies the cumulative errors on the indexing drum, or the positioning errors of work spindle can be realized.

A third object of this invention, is to provide a hob-cutting attachment at a working position, the rotation of a work spindle coming to this position being controlled by a clutch, a synchronized rotation with the hob being transmitted to the work spindle from a hob-driving motor, the construction permitting a similar movement as in an ordinary hobbing stand to occur, and obtaining a simultaneous working with turning operations at other working stations, whereby a multiple-spindle automatic bar machine designed to manufacture pinions is achieved.

BRIEF EXPLANATION OF DRAWINGS

FIG. 5 is a left side end surface view seen from the line V—V of FIG. 3 showing the constitution of the elements of spindle drum indexing;

FIGS. 9 and 10 are partial views showing the construction for the operation of the tool carrier;

Next the construction and action on the basis of an embodiment will be explained.

For convenience of understanding the outline of this invention perfectly, the main construction of the machine as a whole is described at first, then the driving mechanism of work spindle, construction of tool carrier, material feed mechanism, spindle drum indexing mechanism, construction of hob-cutting attachment, arrangement of cams, and the functions relative to each mechanism will be explained.

Figure 2:
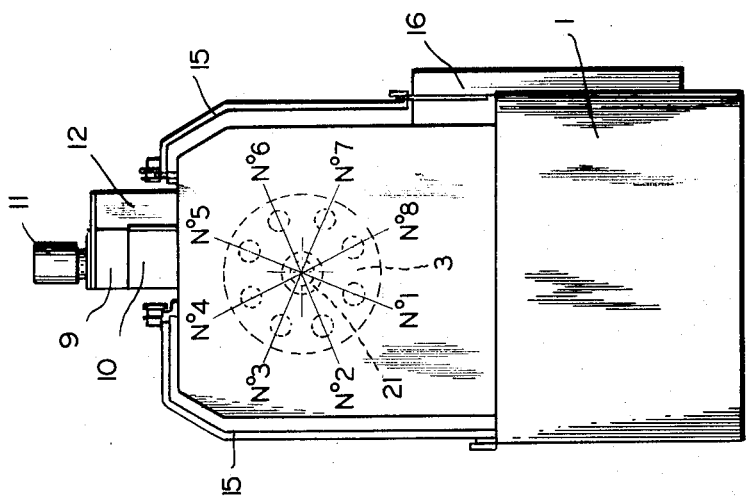
FIG. 2 is its right side view.
Figure 1:
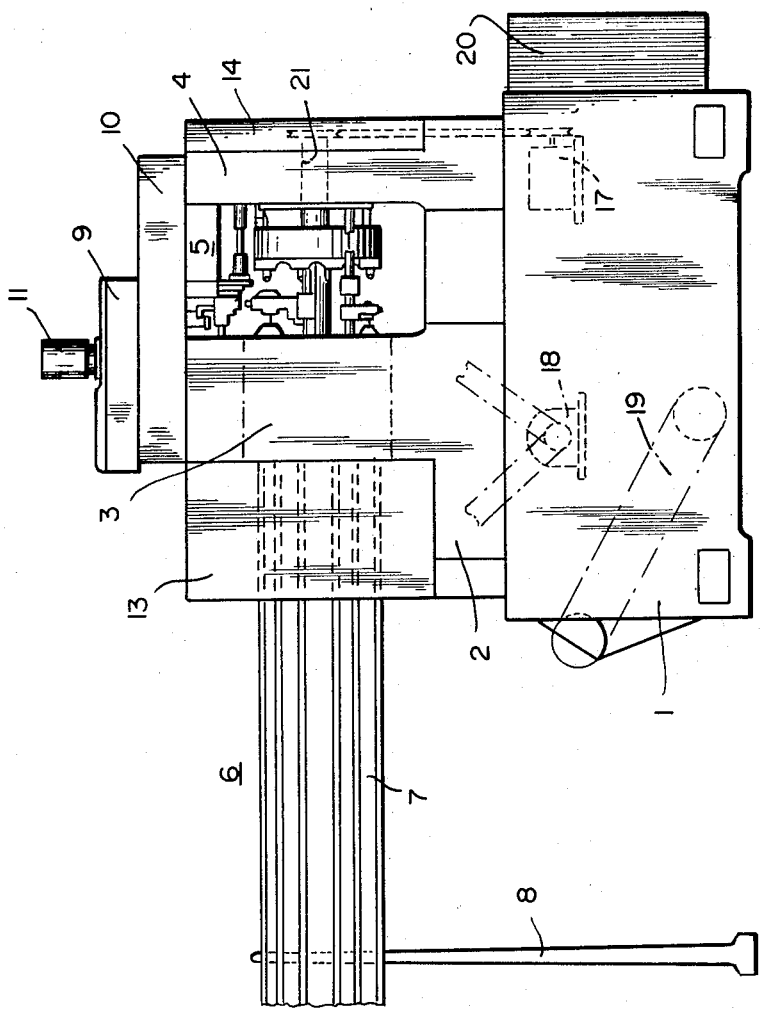
FIG. 1 is a whole front view of a multi-spindle automatic bar machine as an embodiment of this invention.

FIG. 1 and 2 show the general aspect of this machine, in which 1 is a base, in the inside thereof are provided a work spindle driving motor 17, a driving motor 18 for driving the cam shaft and the indexing shaft, a cutting tip removing device 19, cutting oil supply and lubrication systems etc. An electric control box 20 is also mounted at a suitable position of one end of the base 1. The spindle head 2 of the machine is located on the base 1 and divided into 2 parts above and below, in which a spindle drum 3 with many work spindles (6 to 8 in number) is retained rotatably. A driving head 4 stands in parallel oppositely to the head 2 on the base 1 and retains longitudinally a central shaft guide sleeve 21 at the center of the spindle drum 3. In the middle between the head 2 and the driving head 4 is provided a cutting zone 5 that works simultaneously the worked material tightly held by each work spindle. On the opposite side of the cutting zone 5 of the spindle drum 3 are set material holding stands 6 for the worked material which is composed of bar guide tubes 7. Near the other end of the material holding stand 6, there is a supporting stand 8 that is constructed to be able to maintain the bar guide tubes 7 always longitudinally when the indexing drum changes its position by its indexing rotation. 10 is a cross beam frame for setting the hob-cutting attachment, and 9 is a gear box of the hob-cutting attachment and houses an actuation system for making a simultaneous rotation of the spindle for hob-cutter and the work spindle. 13 and 14 are covers for respective machine parts, 15 is transparent cover for cutting zone 5 and 16 is a belt cover. It is noted that reference numerals 1–8 designate the locations of respective working stations.

Figure 3:
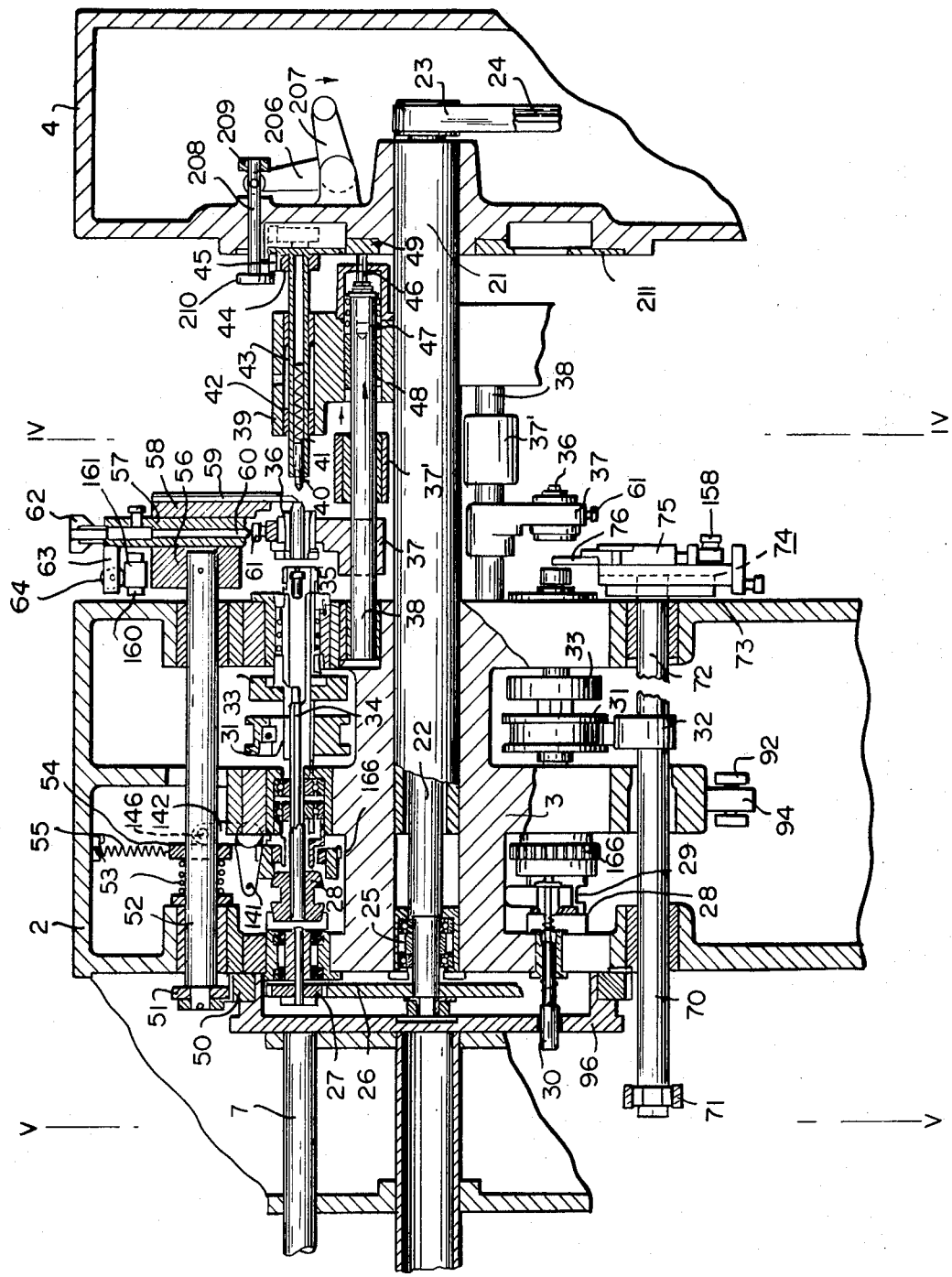
FIG. 3 is a cross sectional view cut along the line I—II—III of FIG. 4 showing the constructions of spindle drum, work spindle bite feeding, and material feeding.

Next the driving mechanism of the work spindle will be explained. In FIG. 3 a central shaft 22 is rotatably mounted through a bearing 25 in a hole bored at the center of the spindle drum 3 and within the guide sleeve 21 securely fitted in the hole along its longitudinal direction, on one end (right end) thereof a pulley 23 is mounted securely to transmit the rotation coming from the driving motor 17 shown in FIG. 1 through a V-belt 24. On the other end of the central shaft 22 a large driving gear 26 is mounted securely and, by meshing with small driven gears 27, secured onto one end of each of work spindles 34, make the work spindles to rotate.

Figure 4:
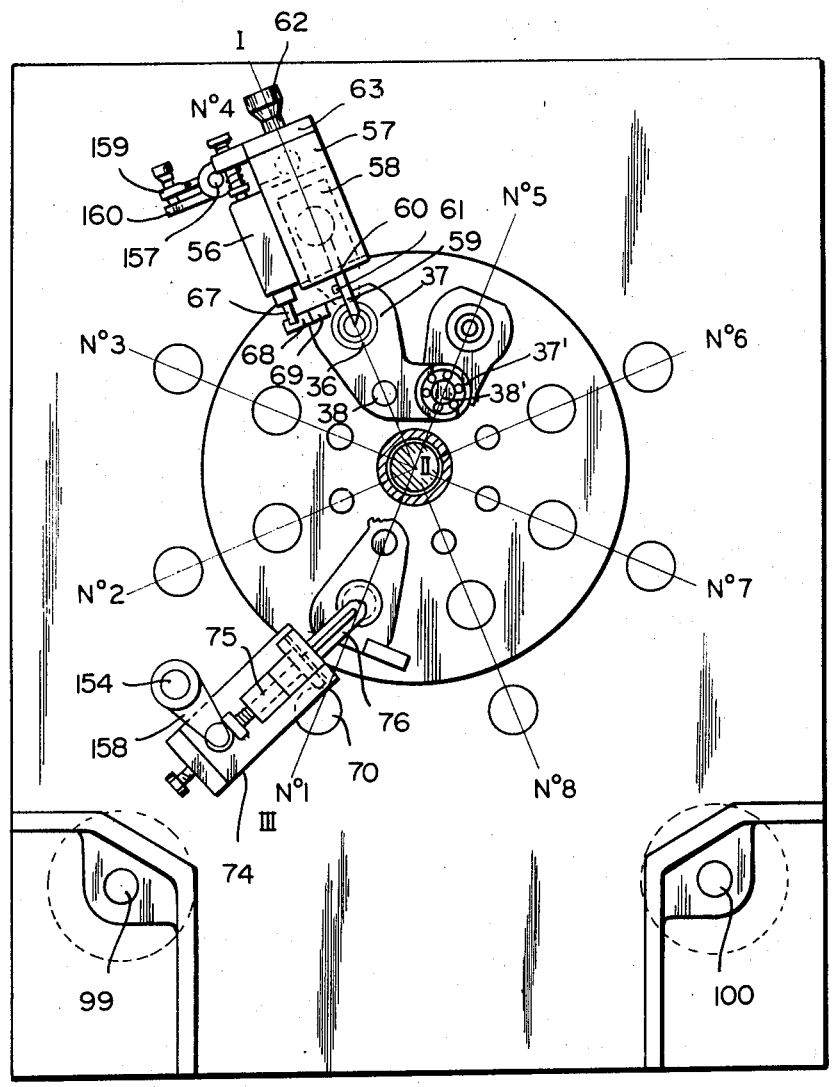
FIG. 4 is a right side end surface view seen from the line IV—IV of FIG. 3 showing the No. 1 and No. 4 stations, the other stations being omitted.

The work spindles 34 are rotatably mounted in holes (6–8 in number) bored in the spindle drum 3 in parallel to its longitudinal direction and all at the same distance from the center. Close to the ends of the small driven gears 27 of said work spindles a cone clutch 28 for change-over is provided, its conical displacing bobbing engages always with a stationary conical surface on the left side to transmit the rotation of the central shaft 22 to a chuck 35 at its end, giving a rotational movement to the bar. However, at a material feeding station (for instance, Station No. 1) when the rotation of work spindle is stopped to re-chuck the material, or when at a station with hob-cutting attachment the rotation of work spindle is required to synchronize with the rotation of hob-cutter by a power coming from another source (for instance, Station No. 5), in order to shift the conical displacing bobbin of the clutch 28 to the right side to make the conical surface on the opposite side come into engaging, a change-over is done by moving a lever 29 engaged in the slot of the clutch displacing bobbin by pushing one end of a clutch actuating rod 30 with levers 164 (FIGS. 5 and 7) and 165 (FIG. 5) to be shifted by cams 103 (FIG. 7) and 115 (FIG. 16) mentioned later, at the said required stations. A right side conical stationary element 166 (FIG. 3) has teeth on its outside surface; these teeth are constituted so as to mesh with the teeth of gear 167 (FIG. 11) driven by a worm shaft 174 of the hob-cutting attachment, giving a synchronized revolution to the work spindle (cf. FIG. 11). Besides, the work spindles 34 (FIG. 3) has chuck bobbins 31 to open and close chuck collets 35 and holders of chuck toggles 33, etc., in a manner similar to that in the construction of work spindles of a single-spindle automatic machine; an explanation of the action of these devices is omitted because it is an obvious matter. At a small distance on the extension line of the chuck of the work spindle, guide bushing 36 that regulate the radial deviation against the axial center of the worked material are securely fitted to guide bushing carriers 37 so as to be positioned longitudinally. The carriers 37 are secured on the sliding shaft 38 held slidably in the holes bored in correspondence to the position of each work spindle around a definite circumference on a tail stock carrier 39 secured on the guide sleeve 21 and the spindle drum 3. As shown in FIG. 4, the leg part of the carrier 37 is extended to grasp slidably a sliding shaft 38' for the work spindle of a subsequent station, thereby the carrier 37 is constructed not to rotate with the sliding shaft 38 as one body. Further on the carrier 37 are set a stop 61 regulating the position in the radial direction of a tool carrier and a stop 68 regulating the position in the circumferential direction of rotation of the drum through a bracket 69 on the said carrier 37 to be detailed later. As shown in FIG. 9(c), the left side end of this bracket 69 extends to form a hook to engage with a location pin 67 mounted on tool carrier in the circumferential direction to make the guide bushings including their carriers and sliding shafts 38, move longitudinally cooperatively with the longitudinal feed movement of the tool carriers. Further, a pin 46 (FIG. 3) is secured on the right side end of the sliding shaft 38, and by the reaction of a spring 47 (FIG. 3) set between said pin and bushing 48 securely fitted in the hole of the tail stock carrier 39, the engaging pins 46 engage under pressure on the surface of a stop ring 49 mounted on the driving head 4 and when the drum rotates for indexing, the pins 46 slide on the surface of the said ring 49. Beyond the guide bushing 36 on the extension of the line of work spindle a center sleeve 41 holding a center 40 at its end is slidably provided in a hole bored in a position opposite to each work spindle of the tail stock carrier 39, in the central hole of said sleeve 41 a compression spring 42 is inserted, one end thereof engages with a pin 43 seated securely on the carrier 39 through a groove cut at a part of the sleeve to make the center sleeve give constantly a pressure in the direction toward the guide bushing 36. Here the length of the groove of sleeve limits the sliding amount of the sleeve. A collar 44 is secured to on the opposite end of the center sleeve 41, and a roller 45 is mounted on the collar so as to be rotatable in the outward radial direction of the central shaft of drum. This roller 45 engages with the inside face of a seat ring obstructive plate 211 mounted on the driving head 4 as shown by a dotted line in FIG. 3 to make the roller 45 slide on the inside surface of the plate 211 in correspondence with its indexing rotation. However, in a position of station required center-working (for instance, hob-cutting position), a part of the obstructive plate 211 is notched, the roller 45 engages with the inside face of the collar 210 mounted at one end of a rod 208 for sleeve sliding, and a collar 209 mounted on the opposite end of the rod 208 is shifted by a cam 129 (FIG. 6) mentioned later through an ordinary cam attachment by levers 206, 207, link and follower, (cf. FIG. 6 and FIG. 15), and therefore the center sleeve 41 (FIG. 3) is made to slide toward guide bushing by a required amount.

Now the construction of the tool carriers will be explained. The main body 56 of the tool carriers is situated at the outer circumference of the work spindle guide bushing carriers 37 for respective station positions to correspond with the guide bushing carrier positions, and set securely at the end of a feed rod 52 mounted slidably and rotatably in a hole of the spindle head 2 bored in parallel to the center line of drum 3 and on the same circumference corresponding to the respective station positions on the outer periphery of drum 3. On the other end of the feed rod 52 is fixed a shift gear 51 that meshes with a large gear 50 for shifting slidably mounted on the spindle drum 3. The shift gear 51 is provided, when the spindle drum 3 makes an indexing rotation, for preventing any part of the tool carriers from interfering with the rotating part; this is effected by shifting the whole tool carriers around the axial line of the shaft 52. The gear 51 has a circular arc-shaped groove as shown in the position of Station No. 4 in FIG. 5; thereby the shift amount is limited by a pin fitted in the groove. A description of the shift driving mechanism will be given later. At the middle of the shaft 52 (FIG. 3) is fixed a collar 54, and a spring 53 is provided between this collar and the spindle head 2 to give constantly a pushing force to the shaft rightward. With the other side face of the collar 54 is engaged a roller 146 mounted on a lever 142 to be shifted by a cam 105 mentioned later (cf. FIG. 7), and the shaft 52 is slid by the movement of lever 142 to give a required longitudinal feed to bits 59 set on the tool carriers. Further, a spring 55 is provided between a part of the collar 54 and a suitable point of the spindle head 2, thereby a rotational force is always given to rotate the shaft 52 in the opposite direction to the shift. This rotational force acts to make location pins 67 (FIG. 4) for circumferential direction on the body 56 (FIG. 4) engage with location stops 68 on the guide bushing carrier 37. On the main body of tool carriers 56 (FIG. 3) are mounted slides 57 for transverse feed that retain a carrier 58 provided adjustably with a bit 59 in the grooves of the main body of tool carriers as shown in FIG. 9, and through the central portion of the slides 57 for transverse feed are inserted location pins 60 for radial direction along the sliding direction. The lower end of the pin engages with stop 61 (FIG. 3) on the guide bushing carrier 37, and on the upper end is mounted adjustable screw 62 that makes fine adjustment of the pointed end of pin. Also on the upper end of the slide 57 is secured the bracket 63 provided with rollers 64, and the roller 64 engages with roller 161 having partly plane surface for the lever 160 shifted by cams 105 (FIG. 7) mentioned later, to give required transverse feed to the bits 59 by the movement of the lever 160. Further, the main body of tool carrier 56 is provided with pins 65 (FIG. 9) having adjustable screws that regulate the extremely left side position of carrier feed as shown in FIG. 9 to engage with stops 66 set on the spindle head 2 at the opposite position to pin 65.

In such a machine it is quite usual that the supply of material is performed at one station (for instance Station No. 1) of the machine. In such a case it is necessary that the rotation of work spindle is topped, the chuck for material is opened and the bar material is pulled out to a required position by a required length, and then the chuck is closed again, the work spindle is brought into rotation for preparing the next working.

Accordingly, these constructions will be explained.

Firstly, as mentioned before, in order to make the rotation of work spindle stop, the change-over clutch 28 (FIG. 3) is disengaged by moving an end of the actuating rods 30 with a lever 164 (FIG. 5) that is pivoted around the y—y axis of FIG. 5 by a cam 103 (FIG. 6) to be mentioned later. Secondly, to open and close the chuck 35 (FIG. 3) of work spindle, the collet actuating rod 70 is slidably retained at a position corresponding to the feeding rod 52 of another station, a lever 71 fitted in a groove at one end of the rod 70 is given a required slide as shown in FIG. 5 by a cam 102 causing pivoting around the y—y axis.

Figure 6:
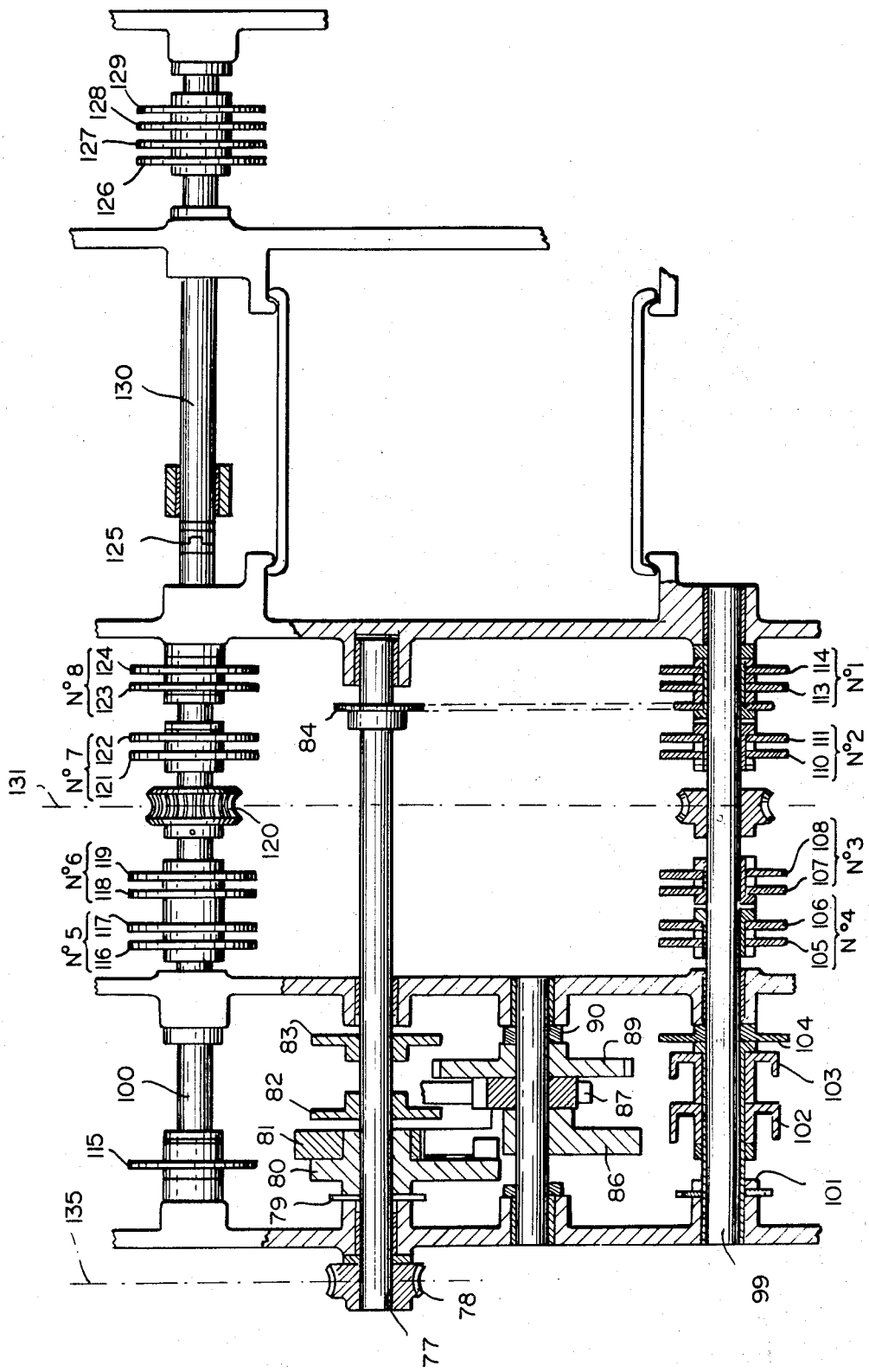
FIG. 6 is a cross sectional plan view cut along the line VI—VI of FIG. 5 showing the constructions of cam shaft, indexing shaft, and Geneva shaft.
Figure 7:
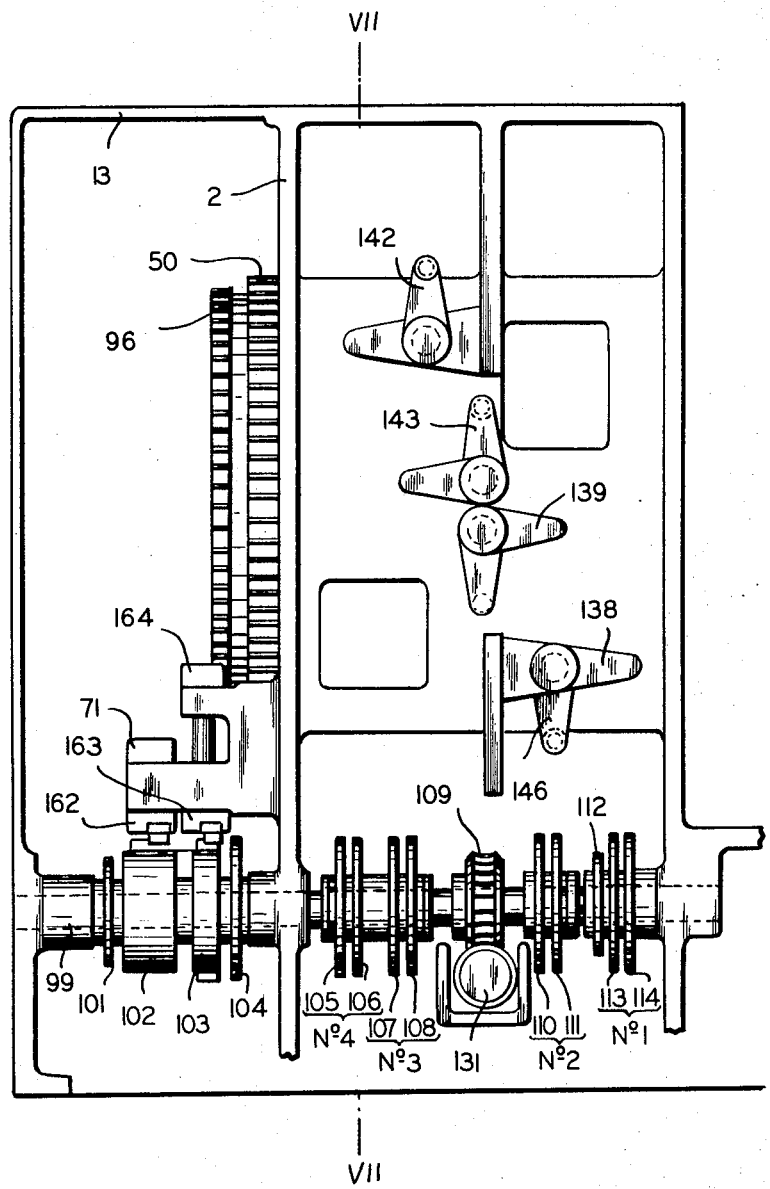
FIG. 7 is a right side surface of FIG. 5 showing the relative constitution of a cam and a lever that make a tool carrier slide.
Figure 16:
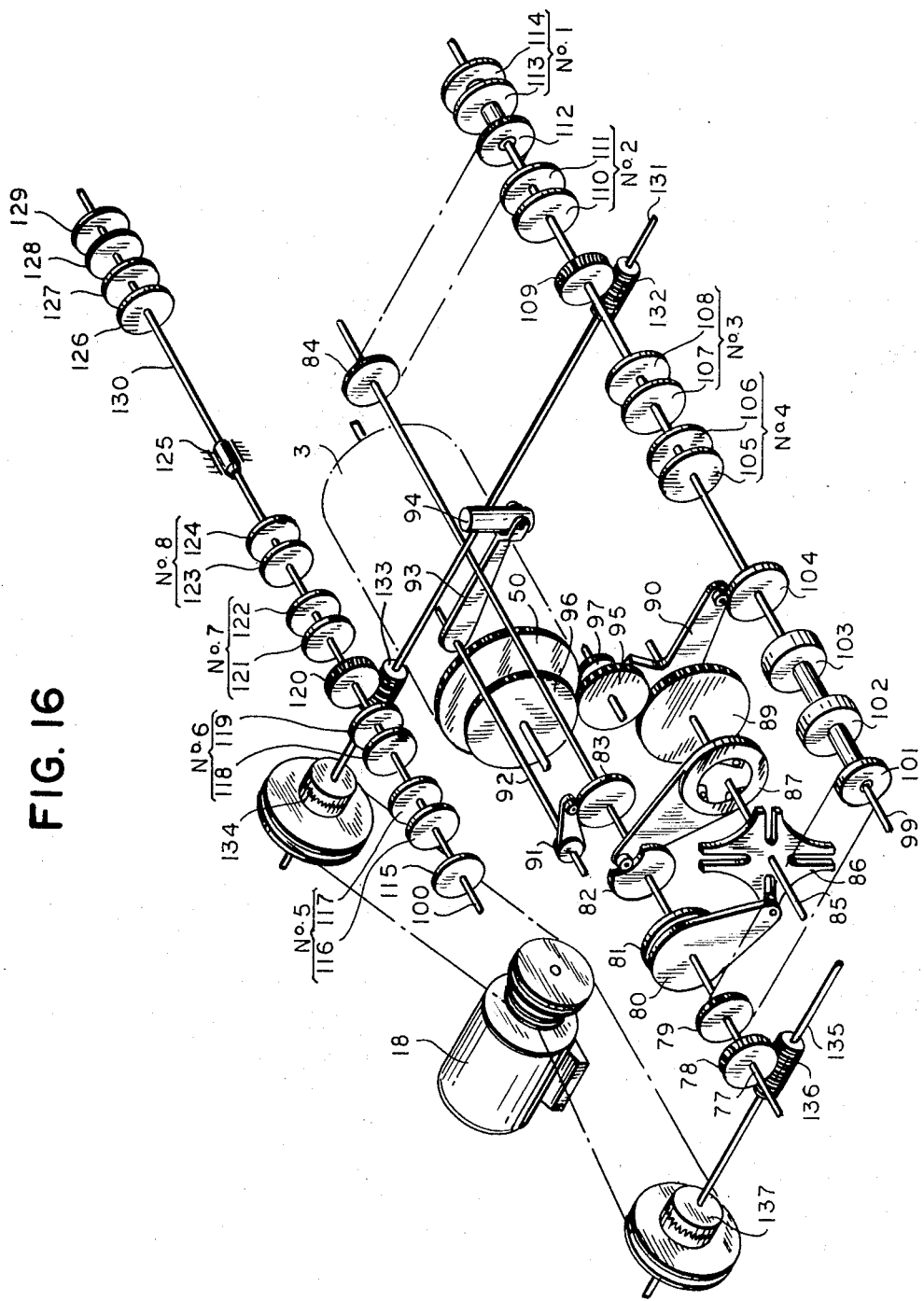
FIG. 16 is an explanatory view showing the overall constructions of the cam shaft and the indexing mechanism.

Further, as shown in FIG. 3, at the positions corresponding to the chucking bobbins 31 of work spindle, the rod 70 is securely provided with dogs 32 meshing with a slot of a bobbin to open and close the chuck at the end of the work spindle by moving the bobbins. Thirdly, to pull out the material a gripper feeding rod 72 is provided near and parallel to the collet actuating rod 70 and is is supported rotatably and slidably in the spindle head 2, and at the end of the said rod 72 a gripper unit 74 is secured. On the other side of said rod 72 is secured a collar (not shown in figures) and by pushing its surface with a lever 138 (FIG. 7) shifted by a cam 114 (FIG. 6), a feeding movement is given by the same mechanism as in the tool carrier feeding rod 52 (FIG. 3) as above mentioned. Fourthly, the gripper 76 mounted on the unit 74 is shifted in the radial direction by a lever 158 secured on the end of the rod 154 (FIGS. 4 and 8) and the said rod is rotated (FIG. 6) by a cam 113 (FIGS. 6 and 16). The gripper unit has a T-shaped gripper rod and said gripper 76 (FIG. 3) pivotably mounted with a spring, and by utilizing the sliding movement in the radial direction of the rod and engaging with stops limiting the up and down strokes, the gripper is opened and closed to perform clamping and unclamping of material. Explanation of this gripping construction is omitted here due to its being well known.

Next, the construction of the indexing mechanism for the spindle drum will be explained, referring to FIG. 3 and FIG. 5. The spindle drum 3 is supported rotatably in the spindle head 2 divided upper and lower two parts at its 3 cylindrical portions A, B, C, and large indexing driving gear 96 is secured on the opposite ends of the working side of the drum. These gears are meshed, through intermediate gear 95, with indexing gear 89 which is securely set on a Geneva shaft 85 rotatably mounted in parallel to the axial line of the drum in the spindle head at the lower position of the spindle drum. As the other obvious construction, a Geneva cross 86 is secured on the shaft 85; and on an indexing drive shaft 77 parallel to the Geneva shaft, a Geneva arm 80 engaging the groove on the cross 86 and a Geneva stop 81 engaging the outer peripheral curve of the same cross 86 are securely mounted.

Figure 8:
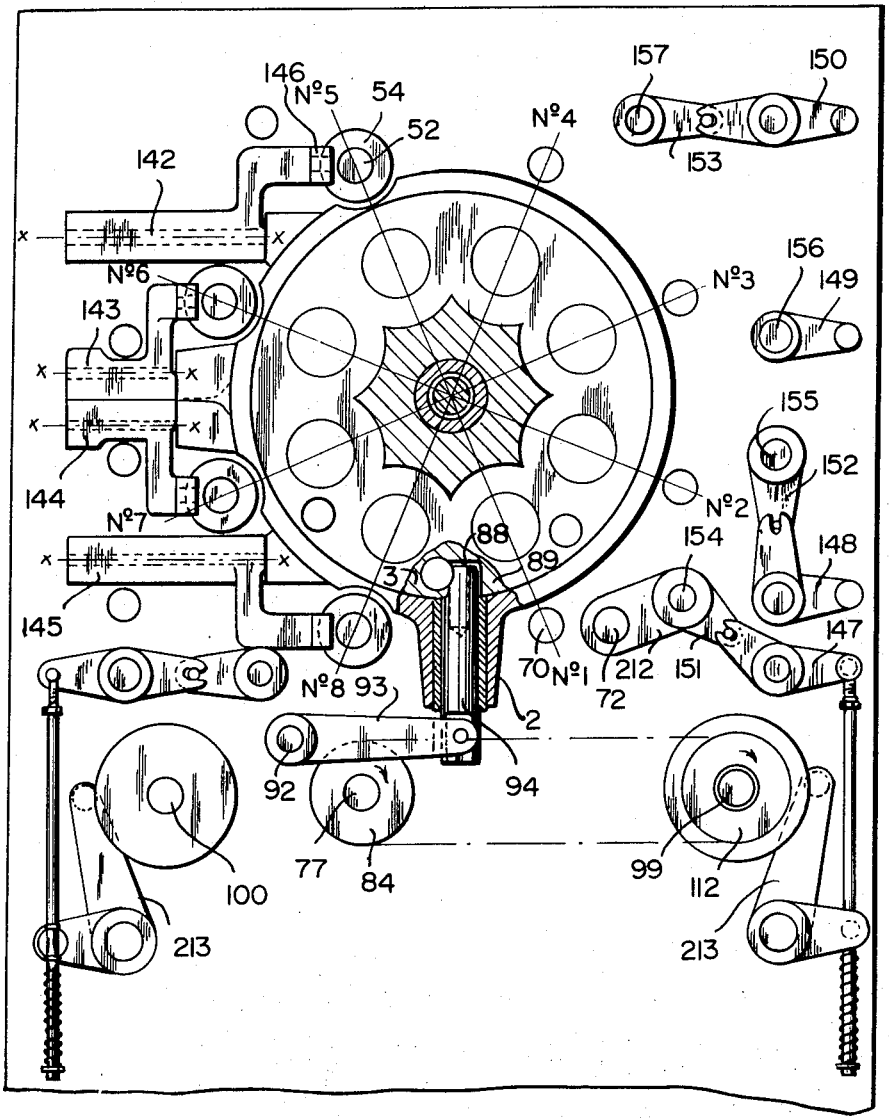
FIG. 8 is a right side view seen from the line VII—VII of FIG. 7 showing the constitution of a traverse feed of the bits of the tool carrier.

In FIG. 16, it is obvious that the drum is indexed, by rotating a worm wheel 78 at the end portion of said shaft 77 by a belt driven by motor 18 through worm 136, worm shaft 135, and electromagnetic clutch 137. On the indexing drive shaft 77 is also secured a cam 83 to make an index location stop pin 94 slide by means of cam lever 91, rod 92 and lever 93. As shown in FIG. 8, pin 94 is engaged in the holes 88 bored around the outer periphery of the central portion of spindle drum 3 the holes corresponding to the desired indexing positions. In addition, a cam 82 (FIG. 5h) is secured on the shaft 77 to engage with a lever 87 retained by a shaft 85 through a one-way clutch. When the lever 87 is fitted to the notched portion of the cam 82, the lever 87 is pulled by a spring 98 to produce a force of counterclockwise rotation, and thus the Geneva shaft 85 is also acted by a force of counterclockwise rotation through the one-way clutch to eliminate the backlash of various transmission mechanisms in the indexing rotation system. It is a matter of course that, as for the clockwise direction, the lever 87 is able to freely rotate on the shaft 85. Next, when the spindle drum makes an indexing rotation, for the purpose of preventing the interference of each of the tool carriers with the rotational parts, the whole tool carriers pivot around the central axis of rod 52 (FIG. 5), the large shift gear 50 that is rotatably mounted on a drum and meshed with a shaft gear 51 is made to rotate by a definite amount, as mentioned before. In this driving construction a lever 90 is securely mounted and engages cam 104 on a cam shaft to be mentioned later; on the other end of lever 90 a sector gear is provided to mesh with the large gear 50 through an intermediate gear 97. The intermediate gears 95 and 97 are coaxially retained rotatably on the same shaft.

Next, the construction of the hob-cutting attachment will be explained. In a multi-spindle machine described here, by mounting a hob-cutting attachment in place of one of the turning tool carriers, the turning work at other stations and the hob-cutting work are simultaneously performed, and it makes it therefore possible to offer a high efficiency pinion multiple-spindle automatic machine, as mentioned before.

Figure 11:
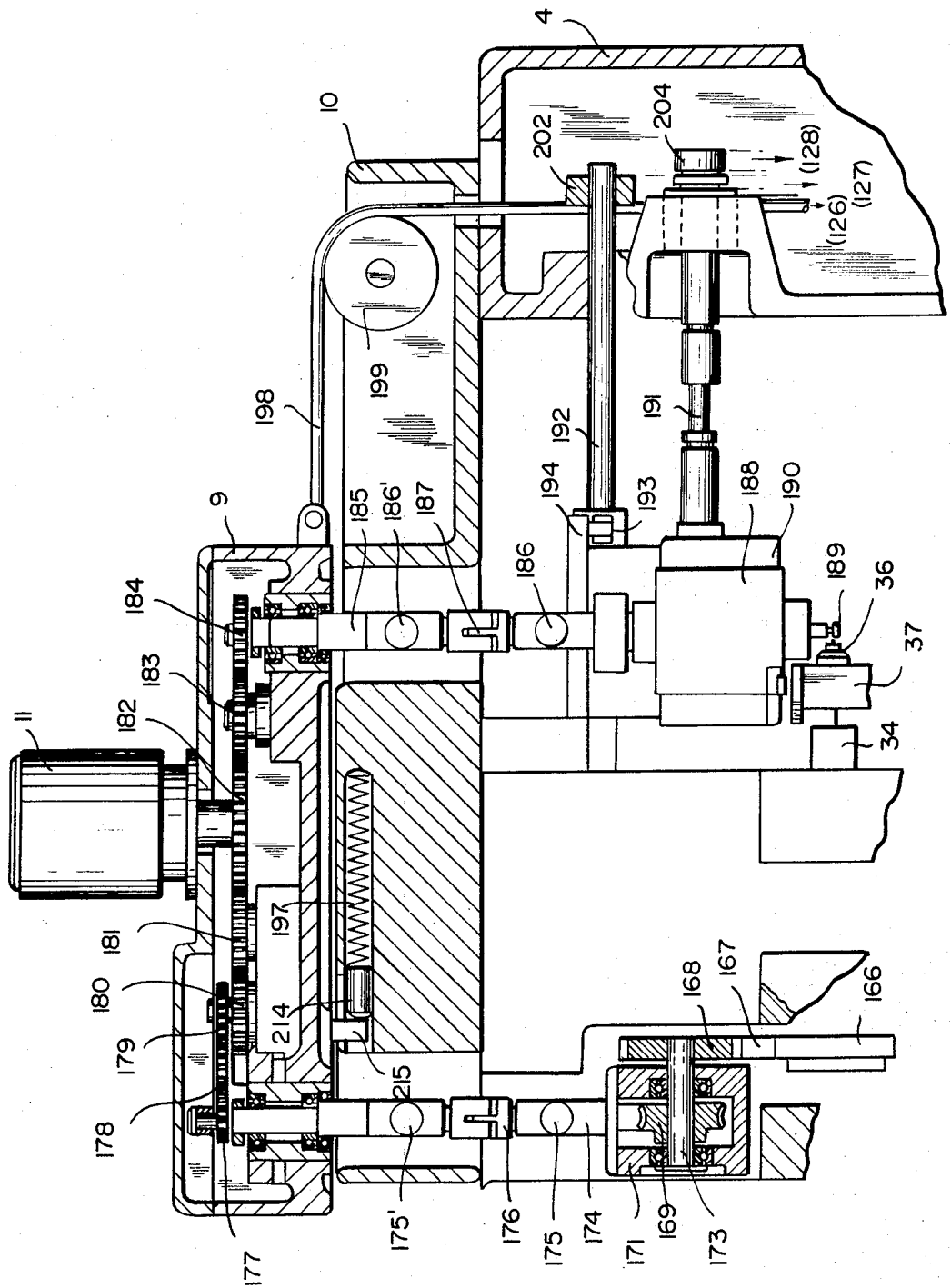
FIG. 11 is a longitudinal cross sectional view of a hob-cutting attachment.
Figure 13:
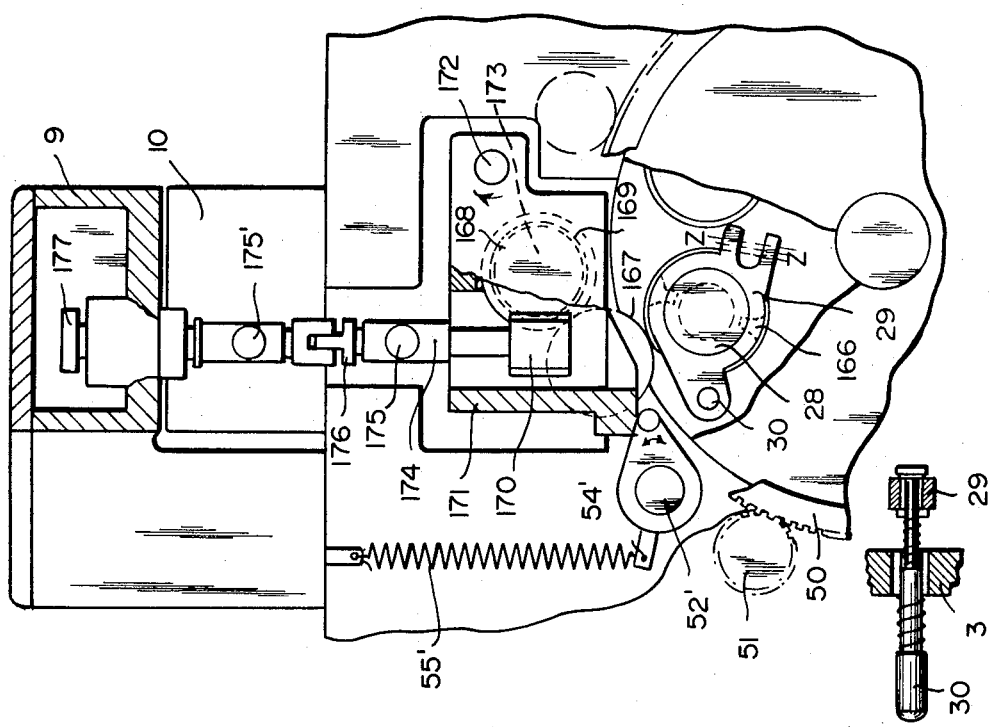
FIG. 13 is a partial sectional view of a worm shaft transmitting means of said attachment.
Figure 12:
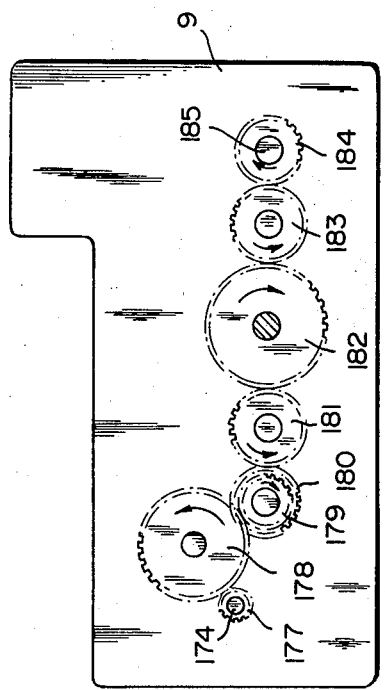
FIG. 12 is a plan view of a transmitting gear train of the hob-cutting attaching.
Figure 15:
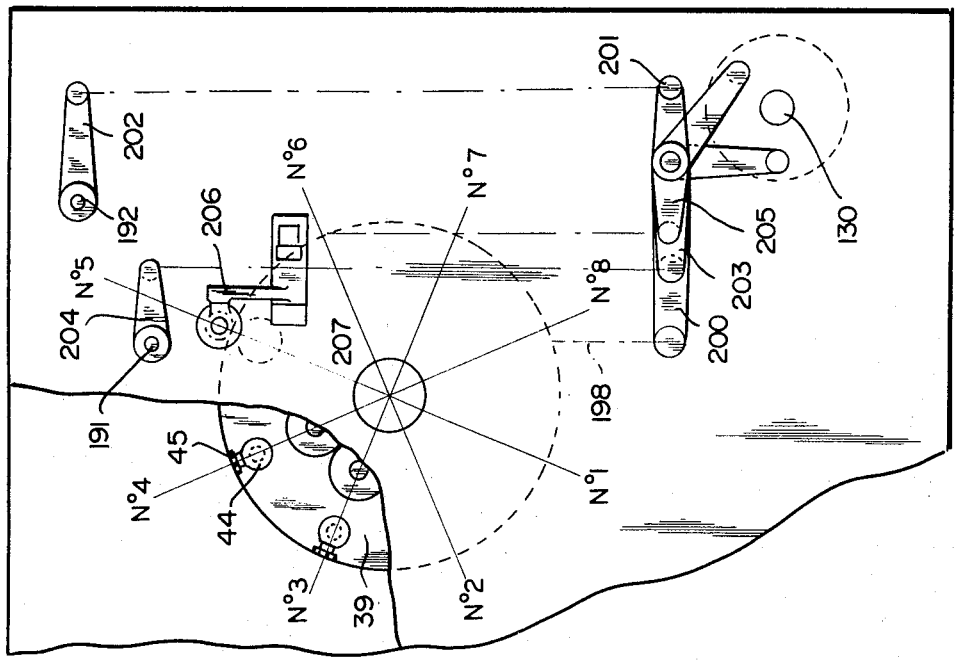
FIG. 15 is a partial view showing the constitutions of a cutter set-up and escape of the hob-cutting attachment and of the mechanism for shifting the center sleeve of a tail stock.
Figure 14:
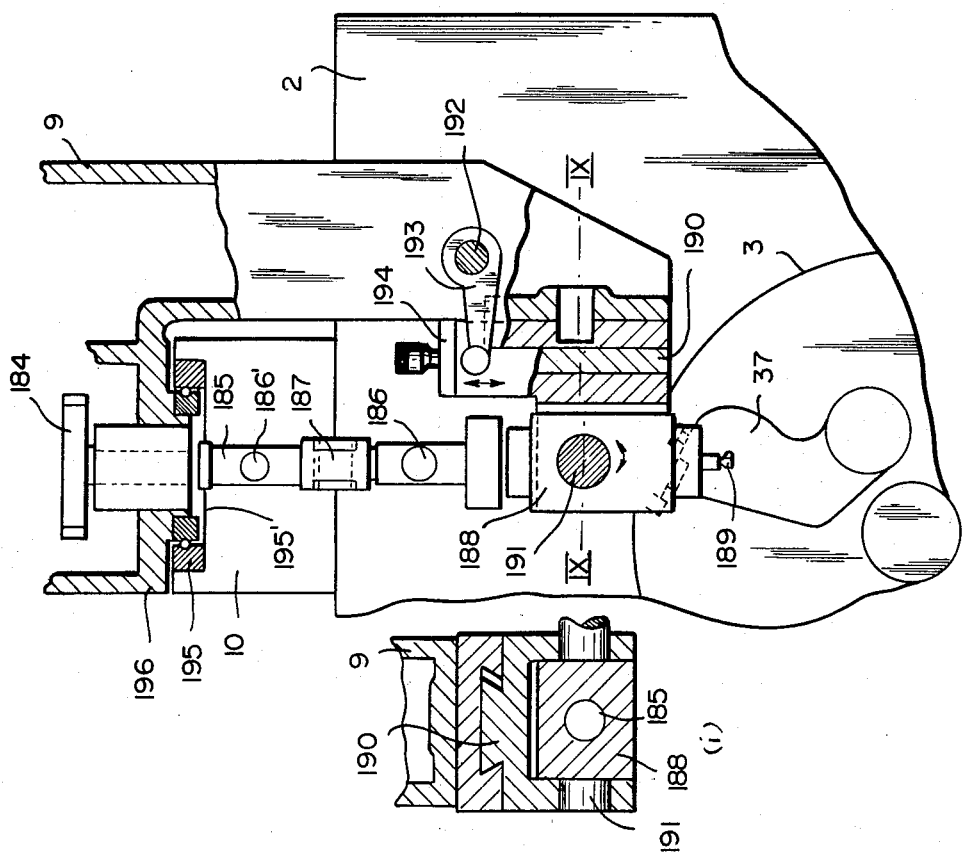
FIG. 14 is a partial cross sectional view of a cutter spindle of said attachment.

Here an embodiment of this invention mounted with a hob-cutting attachment to Station No. 5, for instance, is described (FIGS. 11-14). On the shaft of a motor 11 for driving the hob-cutting attachment a gear 182 is mounted in a gear box 9, and the gear box is slidably placed longitudinally to the work spindle on a beam frame 10 set crosswise between the spindle head 2 and the driving head 4. For the sliding movement of the gear box 9, a ball slide is used which is provided with a ball guide 195 (FIG. 14) on the frame 10 and a ball guide 195' on the gear box 9. A compressive spring 197 (FIG. 11) is inserted into a hole bored in the frame 10 parallel to the axis of the work spindle, and a spring seat 214 at one end of the spring engages with a pin 215 secured to the gear box 9 to apply constantly a leftward force to the box. On the opposite side of the box a rope 198 is fastened, and its other end is connected to a cam lever 200 (FIG. 15) engaging with cam 126 (FIG. 16) to give a necessary longitudinal feed to a hob-cutter 189 (FIG. 11) at end of the hob-cutter shaft 185 through a pulley 199. As shown in FIG. 12, in a transmission gear train housed in the gear box, shaft driving gear 177 mounted at the end of worm shaft 174 meshes with motor gear 182 through several gears 178, 179, 180, 181 and shaft driving gear 184 mounted at the end of cutter shaft 185 meshes with motor gear 182 through gear 183. Worm shaft 174 (FIG. 13) has a worm 170 at the other end and meshes with worm wheel 169 in worm gear box 171 placed in a space bored inside the spindle head 2; at one end of the worm wheel shaft 173 (FIG. 13) a gear 168 is mounted and meshes with a gear provided on the outer diameter of a right-side conical stationary element 166 of clutch 28 through intermediate gear 167. In this case, as mentioned before, the clutch change-over rod 30 (FIG. 13g) is pushed and, by shifting the lever 29 fitted to the groove of clutch displacing a bobbin pivoting around axis Z—Z in FIG. 13, the conical surface of the bobbin is brought to engage with the conical surface of right-side stationary element 166, so that it is possible to transmit the rotation of worm shaft 174 to the work spindle 34 (FIGS 3 and 11) and to make the rotation synchronize with that of the cutter shaft 185 (FIG. 11), by setting the transmission gear train suitably. There is a necessity of tripping the engagement between the gears 167 and 166 in case of making an indexing rotation of drum. The tripping is carried out through such a construction that a rod 52' having a shift gear 51' on one end (FIG. 5) is provided on the same circumference as the position of a feed rod 52 of the other station, but somewhat approached toward a subsequent station, and rotating the rod 52' by making an engaging with one end corner of the worm gear box 171 (FIG. 11), the box 171 provided on a lever 54' secured to the rod 52' is shifted pivoting a pin 172 (FIG. 13) against the action of a tension spring 55'. The worm shaft 174 is provided with flexible couplings 175, 175' and an extensible coupling 176 and compensates the feed slide of gear box 9 and the deflection of shaft center due to the shift of worm gear box 171. Also cutter shaft 185 (FIG. 14) has a hob-cutter 189 on its end and extends to a required position for the material at the end of guide bushing 36 (FIG. 3) placed on the work spindle axis, and a portion of said shaft is embraced by shift block 188 (FIGS. 11 and 14). Block 188 is held further by slide block 190 to be shiftable together with the cutter shaft 185 pivoting axis of a shift rod 191 (FIG. 14 and partial cross sectional view (i)). The other end of rod 191 extends to the inside of driving head 4 and is provided with a lever 204 (FIG. 15) which is connected to cam lever 203 engaged with cam 128 (FIG. 6) through the link rod to make the cam lever shift. The slide block 190 engages a groove provided on a hinged frame formed as an extended portion of the gear box 9, and is able to slide in the radial direction of the spindle axis, and on the under surface of a bracket 194 (FIG. 14) mounted on block 190 there is engaged a roller on lever 193 and by rotating rod 192 fixed to lever 193, the lever 193 is shifted to give a required movement in the radial direction of the spindle axis to the block 190. This traverse movement is to set up a suitable cutting amount of the hob-cutter 189 and to make the cutter escape in the radial direction of the spindle axis for preventing interference when an indexing rotation is performed. The other end of rod 192 extends to the inside of driving head 4 and is provided with a lever 202 and this lever is shifted interlinking with a cam lever 201 engaged with the cam 127 (FIG. 6) through the link rod (FIG. 15). Further, the cutter shaft 185 (FIG. 11) is provided with flexible couplings 186, 186' and an extensible coupling 187 to compensate the shift of said shaft, the setting of cutter traverse amount, and the deflection of axial center due to escape. Since the slide block 190 is engaged to the groove provided on the portion of the box 9, the feed movement of the gear box 9 is exactly transmitted to the hob.

Next, the arrangement feature of cams will be explained. As shown in FIG. 16, two cam shafts, namely the first cam shaft 99 and the second cam shaft 100 are provided at the under position of the spindle head 2 in parallel to the axis of the drum shaft, and on the central portion of each said cam shaft worm wheels 109 and 120 are secured which mesh with worms 132 and 133 mounted on a worm shaft 131 that intersects at right angles to these cam shafts. This worm shaft is driven by a motor 18 through an electromagnetic clutch 134 and a pulley belt. The electromagnetic clutch 134 performs a synchronized movement with an electromagnetic clutch 137 mounted on the worm shaft 135 for driving said indexing shaft 77, so that the cam shafts and the indexing shaft are not rotated at the same time. The first cam shaft 99 is provided with cams for Stations No. 1 – No. 4 and the second cam shaft 100 with cams for Stations No. 5 – No. 8. First the function of the cams on the first cam shaft 99 is explained. As the Station No. 1 serves to supply materials, in case the material for on bar has been used up, it is needed to stop immediately the rotations of the indexing shaft and the work spindle at the same time, but in the other stations the work spindle should not be stopped until the total one cycle work specified in each station is completed, so that the cam for Station No. 1 must undergo a synchronous movement with the indexing shaft 77 different from the movements of other stations. For this purpose a cam 102 (FIGS. 6 and 16) for opening and closing the chuck and a cam 103 for opening and closing the clutch in Station No. 1 are secured on a rotatable bushing around the shaft 99, and a chain wheel 101 mounted on the same bushing is connected with a chain to a chain wheel 79 matched with the wheel 101 on the indexing shaft 77 so as to give a synchronized rotation with the indexing shaft. Also a cam 114 for applying a feed movement to a gripper feed rod 72 (FIG. 3) and a cam 113 (FIG. 6) for making the gripper shift in the radial direction are fixed on the rotatable bushing around the shaft 99, and a chain wheel 112 mounted on the same bushing is connected with a chain to a chain wheel 84 matched with the wheel 112 on the indexing shaft 77 (FIG. 6) so as to give a synchronized rotation with the indexing shaft. A series of other cams are all secured on the shaft 99 through suitable cam holders. In other words, the longitudinal feed cams 111, 108, 106 and the transverse feed cams 110, 107, 105 respectively for Stations Nos. 2, No. 3, and No. 4 are mounted as shown in FIG. 6 and FIG. 16. Further, a cam 104 for shifting the tool carrier is also mounted on this shaft. On the second cam shaft 100 are similarly mounted cams for longitudinal feed 117, 119, 122, 124 of Stations No. 5, No. 6, No. 7, and No. 8 and cams for traverse feed 116, 118, 121 and 123 respectively. Also on the shaft 100 a cam 115 for opening and closing the clutch when a hob-cutting attachment is placed in Station No. 5. Further, at the right end of the cam shaft 100 exists a cam shaft 130 on the extension of the axis through a coupling 125, and on the cam shaft 130 are secured a longitudinal feed cam 126 for the hob-cutting attachment, a cam 127 for hob-cutter set-up and escape, a cam 128 for shifting, and a cam 129 for sliding the center sleeve 41. To each cam of the cam shafts 99, 100, 130 is engaged a lever 213 having a cam follower as shown in the lower part of FIG. 8, and the lever 213 is connected with lever links and the like at appropriate positions through respective connecting rods to transmit required movements, which are ordinarily obvious cam mechanisms. In the left half of FIG. 8 is shown a part of lever for imparting movement to the feed rod 52 of each station, and levers 142, 143, 145 are shifted pivoting around each of the x—x axis to push the collars 54 through respective rollers 146. On the right half of the FIG. 8 is shown a part of the construction such that shift rods 154, 155, 156, 157, etc. for giving traverse movement in the radial direction are connected with shifting levers and links 147, 148, 149, 150, 151, 152, 153, etc. Also in order to make the movement of gripper slide rod 72 (FIG. 3) of Station No. 1 and that of shift rod for radial direction 154 interlink with each other, a link 212 (FIG. 8) is provided to fix the rod 72 and to permit the shift rod 154 to rotate but prevent to slide.

In a multi-spindle automatic machine of this invention, it is constructed and functional as mentioned before. The deviation of material in the radial direction of spindle axis is regulated by a guide bushing mounted on the front of work spindle, the bushing being slidably retained in the longitudinal direction, and the end face thereof and the point of cutting tool can be made to perform the same movement keeping always their relative position constant, so that the defects of presently used multiple-spindle automatic machines, namely, the larger the distance between the cutting tool and the chuck, and the smaller the diameter of the work material, the larger the displacement of work material due to the cutting stress. This lowering of the working accuracy, is completely eliminated by the present construction, resulting in carrying out work of high precision. Especially, the effect is conspicuous for working of small-size bar materials, for instance, of less than 4 mm in diameter. By providing location stops in the circumferential and radial directions of rotation of drum on the guide bushing, and by making these location stops engage with their corresponding location pins mounted on the tool holders of each tool carrier, the position of the tool carrier is regulated according to the position of the material retained by the work spindle, and the accumulated index error of spindle drum, that is, the sum of locational errors of individual work spindles is eliminated yielding high precision products not obtained by the conventional multi-spindle automatic machines. The effect of the precision increase becomes larger as the diameter of the product is decreased.

Furthermore, in a multi-spindle automatic machine of such a construction, by mounting a hob-cutting attachment on one of the stations, small-sized pinions of high precision (for instance, watch parts for ladies' use) are produced. These, have been usually manufactured by performing the work of crude material with a single-spindle automatic machine, while the work of tooth-cutting with a tooth cutting machine. The total manufacturing time was taken as the sum of working times of respective machines, resulting in poor efficiency. With the multiple spindle automatic machine of the present invention, it is, are possible to manufacture with high efficiency and high precision, by performing the turning work and the hob-cutting work simultaneously. Moreover, in the secondary tooth-cutting work by the conventional process using a tooth-cutting machine, the turn material finished in the first working step must be re-chucked again, so that it is technically very difficult to eliminate the deflection between the shaft center and the outer face for teeth forming and to supply the material automatically at the second working step; in addition it is usual that the finished product must be selected by equipping an automatic selecting device. Consequently, it is unavoidable that instability of process and troublesomeness for maintaining the good function of machine are accompanied. In contrast, the use of multi-spindle automatic machine of this invention makes it possible to perfectly eliminate these defects, increasing the productivity to a great extent.

The configuration and construction of the machine according to this invention are not limited by the embodiment here described but it is possible to appropriately attach devices for drilling, threading, tapping reaming, etc., and to make some modifications, insofar as the essentials and claims of this invention are not departed.

I claim:

1. A multi-spindle automatic bar machine comprising an indexible spindle drum a plurality of rotatable work spindles spaced at equal intervals along a common circle in said spindle drum, said circle being coaxial with same, said spindles when said drum is at rest being at fixed spindle positions, a plurality of tool carriers equal in number to the number of work spindles, each of said tool carriers being located at a position suitable for coacting with a spindle at a spindle position, said tool carriers being swingably mounted on said machine and being slidable both parallel to and radially to the corresponding spindle axis when in a spindle position, cutting tools mounted on a plurality of said tool carriers, each of said tool carriers being movable relative to the corresponding spindle to bring a tool into and out of overlapping relationship with a workpiece on a corresponding spindle simultaneously, each of said workpieces being transferable on its corresponding spindle to a successive tool carrier position by indexed rotation of said drum, a plurality of guide bushing carriers, each supporting a guide bushing having an end face and each corresponding to a spindle, said bushings being slidable parallel to said drum axis and said spindle axes and serving to prevent deflection of said workpiece by said tool, and means connected to each tool carrier to move the corresponding guide bushing in an axial direction and maintain a constant axial distance between an end face of said bushing and the cutting point of a tool mounted on the corresponding tool carrier.

2. The multi-spindle automatic bar machine as defined in claim 1, further comprising a first location pin on each tool carrier, corresponding first location stop means secured on each corresponding guide bushing, means engaging said first location pins and corresponding first stop means by radial movement of each of said tool carriers for the elimination of indexing error in the radial direction, a second location pin on each of said tool carriers, corresponding second location stop means secured on each corresponding guide bushing carrier and means engaging said second pin and second stop means by swinging movement of said tool carrier for the elimination of circumferential error in the indexing of said drum and spindles.

3. A multi-spindle automatic bar machine claimed in claim 1, providing, for manufacturing pinions, at least a hob-cutting attachment at one station of the machine and a means for mechanically transmitting a synchronized rotation to the work spindle of the station from the hob-driving motor with a definite rate for the hobbing.

* * * * *